US010662000B2

(12) United States Patent
Grazioli et al.

(10) Patent No.: US 10,662,000 B2
(45) Date of Patent: May 26, 2020

(54) MOVEMENT SYSTEM OF CONTAINERS BETWEEN OPERATING UNITS

(71) Applicant: SMI S.p.A., Bergamo (IT)

(72) Inventors: Marco Grazioli, Bergamo (IT); Valentina Clivati, Bergamo (IT)

(73) Assignee: SMI S.p.A., Bergamo (IT)

( * ) Notice: Subject to any disclaimer, the term of this patent is extended or adjusted under 35 U.S.C. 154(b) by 203 days.

(21) Appl. No.: 15/898,336

(22) Filed: Feb. 16, 2018

(65) Prior Publication Data

US 2018/0237230 A1    Aug. 23, 2018

(30) Foreign Application Priority Data

Feb. 22, 2017  (IT) .......................... 102017000019857

(51) Int. Cl.
*B65G 47/84*    (2006.01)
*B67C 3/24*     (2006.01)
(Continued)

(52) U.S. Cl.
CPC ............ *B65G 47/847* (2013.01); *B29C 49/36* (2013.01); *B29C 49/421* (2013.01);
(Continued)

(58) Field of Classification Search
CPC ... B29C 49/36; B29C 49/4205; B29C 49/421; B29C 49/68; B29C 2049/5862;
(Continued)

(56) References Cited

U.S. PATENT DOCUMENTS 6,152,723 A  * 11/2000 Winter .................... B29C 49/28
                                                425/526
7,998,396 B2 *  8/2011 Rousseau ............ B29C 49/4205
                                                264/523
(Continued)

FOREIGN PATENT DOCUMENTS

DE     102010053476 A1 *  6/2012  ............. B65G 29/00
DE     102011116883 A1    10/2012
(Continued)

OTHER PUBLICATIONS

Search Report dated Oct. 10, 2017 and Written Opinion dated Feb. 22, 2017 from the Italian Patent Office for corresponding IT Application No. 102017000019857.

*Primary Examiner* — Robert B Davis
(74) *Attorney, Agent, or Firm* — Walter | Haverfield LLP; D. Peter Hochberg; Sean F. Mellino

(57) ABSTRACT

The present invention relates to a movement system of containers to and from operating units, in particular blowing units for bottles made of plastic material or filling units.
In particular, the invention relates to a movement system of containers to and from a processing unit of said containers, comprising:
  a rotating carousel, at the perimeter of which a plurality of said processing units are arranged;
  a distribution unit (3) of said containers, comprising at least one distribution star (107) placed substantially at a tangent to said carousel and rotating in synchrony, but in the opposite direction to said carousel,
characterized in that
  said distribution unit (3) comprises a plurality of upper clamps (13) for transferring a container to a respective processing unit and a plurality of lower clamps (14) for transferring a container from said processing unit to said distribution unit (3),
(Continued)

and in that
said processing unit comprises a clamp, which is movable between an upper position, at the level of said upper clamps (13) of the distribution unit (3), for the gripping of a container by a respective upper clamp (13) of the distribution unit (3), and a lower position, at the level of said lower clamps (14) of the distribution unit (3), for transferring said container to said processing unit.

25 Claims, 12 Drawing Sheets

(51) Int. Cl.
| | |
|---|---|
| *B29C 49/36* | (2006.01) |
| *B29C 49/42* | (2006.01) |
| *B65G 47/86* | (2006.01) |
| *B29C 49/56* | (2006.01) |
| *B29C 49/68* | (2006.01) |
| *B29C 49/48* | (2006.01) |
| *B29L 31/00* | (2006.01) |
| *B67C 3/22* | (2006.01) |

(52) U.S. Cl.
CPC .......... *B29C 49/4205* (2013.01); *B29C 49/48* (2013.01); *B29C 49/56* (2013.01); *B29C 49/68* (2013.01); *B67C 3/24* (2013.01); *B29C 2049/563* (2013.01); *B29L 2031/7158* (2013.01); *B65G 2201/0244* (2013.01); *B67C 2003/227* (2013.01)

(58) Field of Classification Search
CPC .... B29C 2049/5872; B29C 2049/5803; B29C 2049/5806; B29C 49/58; B65G 47/847; B67C 2003/227
See application file for complete search history.

(56) References Cited

U.S. PATENT DOCUMENTS

| | | | |
|---|---|---|---|
| 8,926,314 B2* | 1/2015 | Forsthoevel | B65G 29/00 198/346.3 |
| 2010/0052224 A1* | 3/2010 | Humele | B29B 13/024 264/489 |
| 2011/0056809 A1 | 3/2011 | Borgatti et al. | |

FOREIGN PATENT DOCUMENTS

| | | |
|---|---|---|
| DE | 102014005321 A1 | 10/2015 |
| EP | 1445090 A1 | 8/2004 |

* cited by examiner

MOVEMENT SYSTEM OF CONTAINERS BETWEEN OPERATING UNITS

CROSS REFERENCE TO RELATED APPLICATION

This application claims foreign priority to Italian (IT) Application Serial No. 102017000019857 filed on Feb. 22, 2017, the content of which is incorporated herein by reference in its entirety.

BACKGROUND OF THE INVENTION

Field of the Invention

The present invention relates to a movement system of containers to and from operating units, in particular blowing units for bottles made of plastic material or filling units.

Background Art

In packaging plants, the movement of containers between the various operating units in the plant, each assigned to a specific processing phase, is carried out by linear transport systems (conveyers or similar) or rotary transport systems, in other words the so-called distribution stars. The latter are used particularly in rotary systems comprising the use of carousels, on which the containers undergo special processing.

For example, the bottle blowing phase, starting from the preforms, takes place in blowing units supported on a rotating carousel. The preforms, opportunely heated by a passage in an infrared oven, are moved by a distribution star, also rotating in synchrony with the carousel, which transfers each single preform to a blowing unit. Another distribution star is placed in a downstream position in relation to the rotating direction of the carousel, which collects the bottle blown by the blowing unit and sends it, by other transport means (distribution stars or linear conveyers), for subsequent processing.

Another example, which includes the same processing method is the filling of the bottle with a product, which takes place in rotating carousels supporting a plurality of filling valves. In this case, too, the single bottle is transferred to the respective filling unit from a distribution star rotating in synchrony with the carousel, and the filled bottle is taken from another distribution star, placed downstream in relation to the rotating direction of the carousel.

From the above it is clear that the processing undergone by the container, for example the blowing or filling, must take place in the circular part of the journey between the loading distribution star and the collecting distribution star of the container. Consequently, in order to avoid interference between the loading star and the collecting star of the containers such circular part of the journey has an angular amplitude below 360°, creating a dead angle in which no operation is carried out. This undoubtedly limits the rotation speed of the carousel, not being possible to reduce the processing times beyond a certain limit, and therefore also the plant's productivity.

SUMMARY OF THE INVENTION

The problem addressed by the present invention is to provide a movement system of containers to and from a processing unit, which allows the drawbacks of the prior art to be overcome and the plant's productivity to be improved.

Such problem is overcome by a movement system of containers as outlined in the appended claims, whose definitions constitute an integral part of the present description.

A further object of the invention is a system for the treatment of containers comprising the movement system according to the present invention.

Further characteristics and advantages of the present invention will become clearer from the description of various examples of embodiment, given here by way of example, which are not limiting.

DETAILED DESCRIPTION OF THE INVENTION

Figure 1:
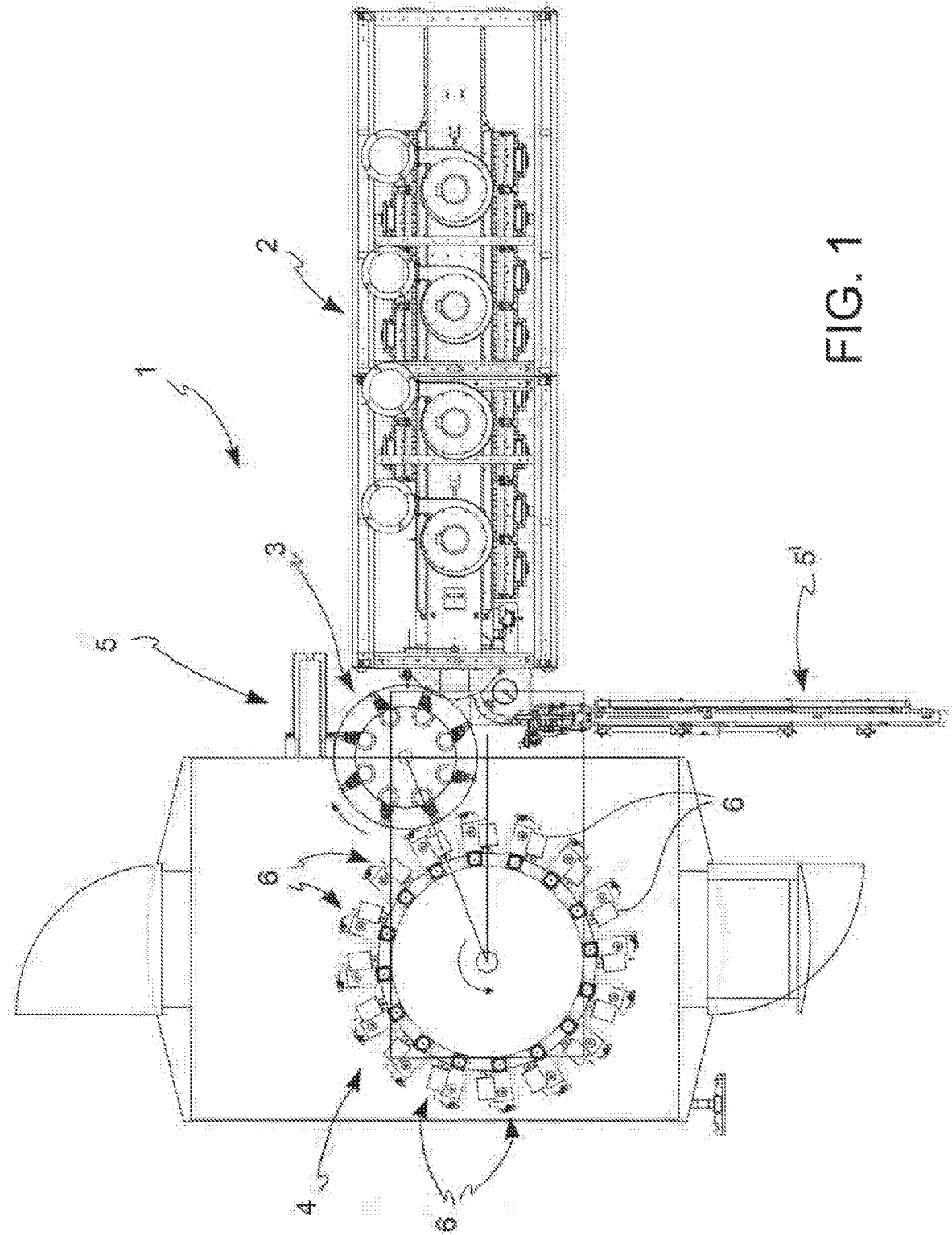
FIG. 1 represents a plan view from above of a container blowing system comprising the movement system according to the invention.

With reference to FIG. 1, a blowing system of bottles made of plastic material, typically PET, is shown, globally indicated with number 1, comprising an oven 2 for heating the preforms to the softening temperature, a blowing carousel 4 and a distribution unit 3, which:

takes the heated preforms coming out of the oven 2 and transfers them to said blowing carousel 4, and takes the blown bottles from the blowing carousel 4 and transfers them to a transport system 5 for sending the bottles for subsequent processing.

The plant also comprises a transport system 5' for sending the preforms to the oven 2. Typically, the oven 2 is an infrared oven. Both the oven 2 and the transport systems 5, 5' are quite conventional and will not, therefore, be further described.

The blowing carousel 4 is, as a whole, also of a conventional type, rotated by a drive (not shown) in synchrony with the distribution unit 3. The blowing carousel 4 comprises a plurality of blowing units 6 along its perimeter, which comprise a mold for blowing and shaping the bottles, means for introducing a pressurized fluid into a preform inside said mold and means for transferring a preform from said distribution unit 3 to said mold. Further details will be provided in the following description.

Figure 2A:
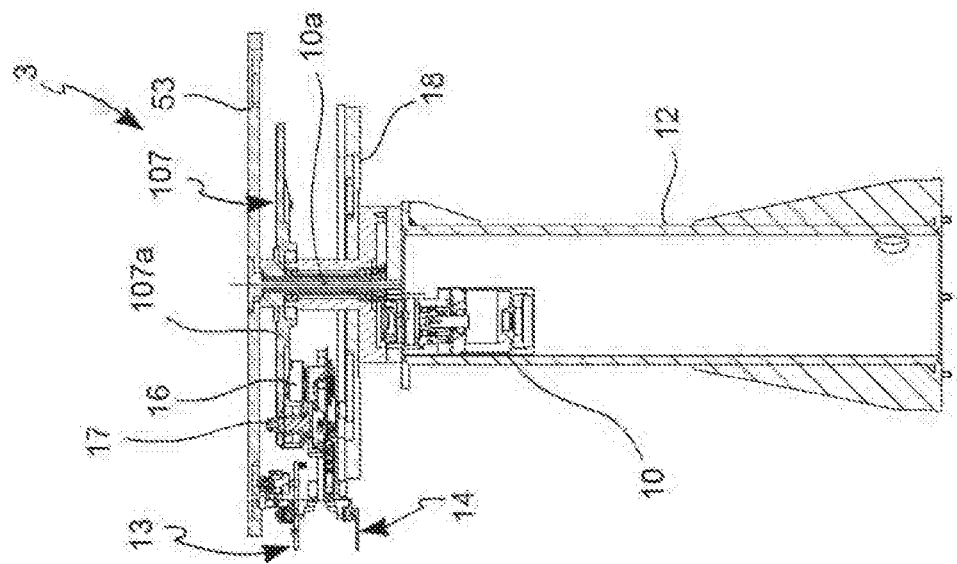
FIG. 2A represents a side view of a detail of the movement system of the invention, according to a first embodiment.

According to a first embodiment, shown in FIG. 2A, the distribution unit 3 comprises a first distribution star 7 and a second distribution star 8 placed coaxially in relation to each other, the first distribution star 7 being situated at the top in relation to the second distribution star 8. The distribution stars 7, 8 are hinged to a support structure 12.

Each of the two distribution stars 7, 8 comprises a plurality of clamps 13, 14, along their edge, adapted to hook the neck of a preform or, respectively, of a bottle. In some embodiments, such clamps are of a passive type, in other words suitable for opening as a result of interference with the neck of the container and closing again exerting a sealing action thanks to the action of preloaded elastic means, as will be better described later on.

The distribution stars 7, 8 are rotated independently by respective drives 10, 11. The drives 10, 11 are preferably brushless rotary motors, programmed to rotate in synchrony with the blowing carousel (see the arrows in FIG. 1), so as to transfer the preform being processed to the tangent point between the distribution stars 7, 8 and the carousel 4.

The movement system according to the invention is designed so that the upper distribution star 7 takes the heated preform from the oven 2 and transfers it to a blowing unit 6 in transit on the carousel 4, while the lower distribution star 8 takes a blown bottle from a distribution unit 6 and transfers it to the transport system 5.

Further details of the working of the clamps 13, 14 and the blowing unit 6 will become clear from the following description.

Figure 2B:
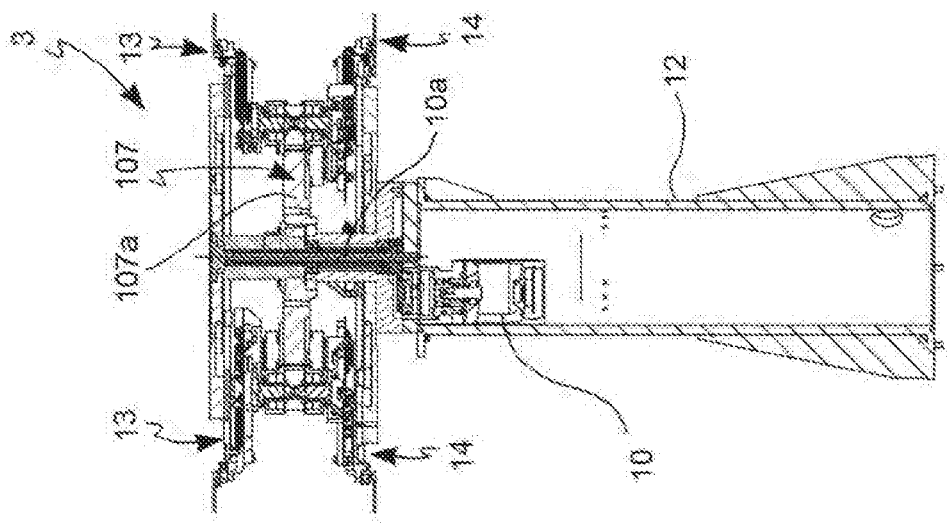
FIG. 2B represents a side view of a second embodiment of the detail in FIG. 2A.
Figure 2C:
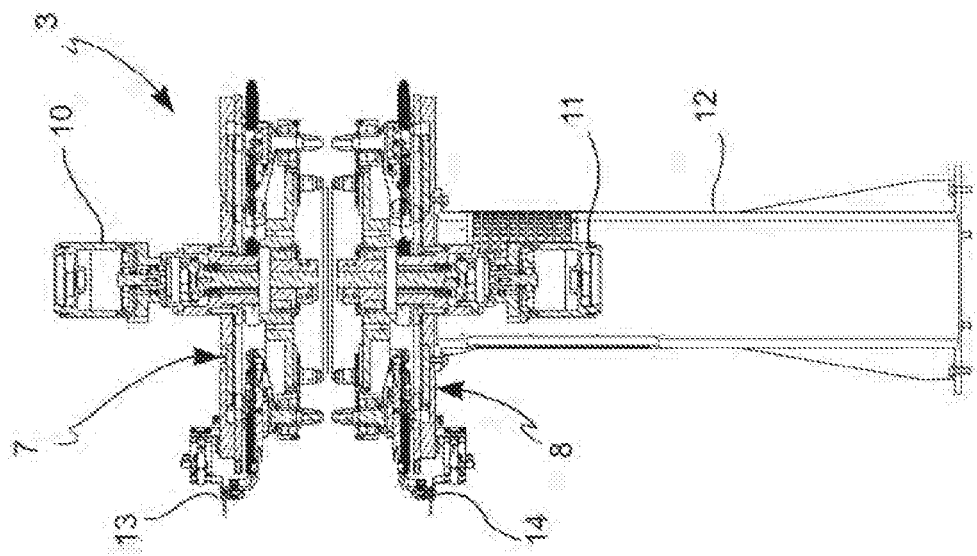
FIG. 2C represents a side view of a third embodiment of the detail in FIG. 2A.

FIGS. 2B and 2C show two variations of a different embodiment of the distribution unit 3 of the invention, wherein the two distribution stars 7, 8 have been replaced by a single distribution star 107, which comprises a plurality of first clamps 13 and a plurality of second clamps 14, wherein the first clamps 13 are placed at the top in relation to the second clamps 14 and aligned therewith on a vertical axis. For this reason, the first clamps 13 will also be indicated as "upper clamps" and the second clamps 14 will also be indicated as "lower clamps".

The difference between the variation in FIG. 2B and the one in FIG. 2C does not regard the operating mechanism of the distribution star 107 so much, but the difference essentially lies in a greater structural compactness of the variation in FIG. 2C. The following description will thus refer to the latter version of the distribution unit 107, it being understood that it will also be equally applicable to the version in FIG. 2B, subject to the necessary modifications in the design of the machine.

Figure 3:
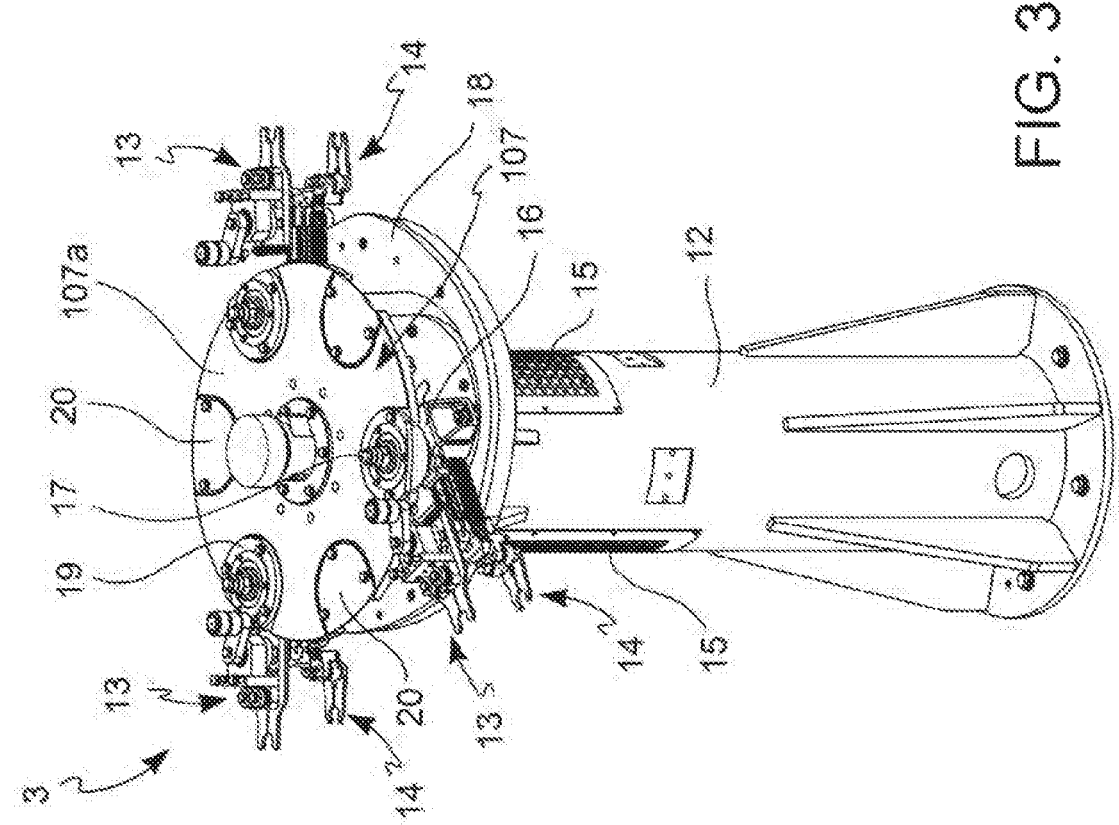
FIG. 3 represents a perspective view of the detail in FIG. 2C.
Figure 4:
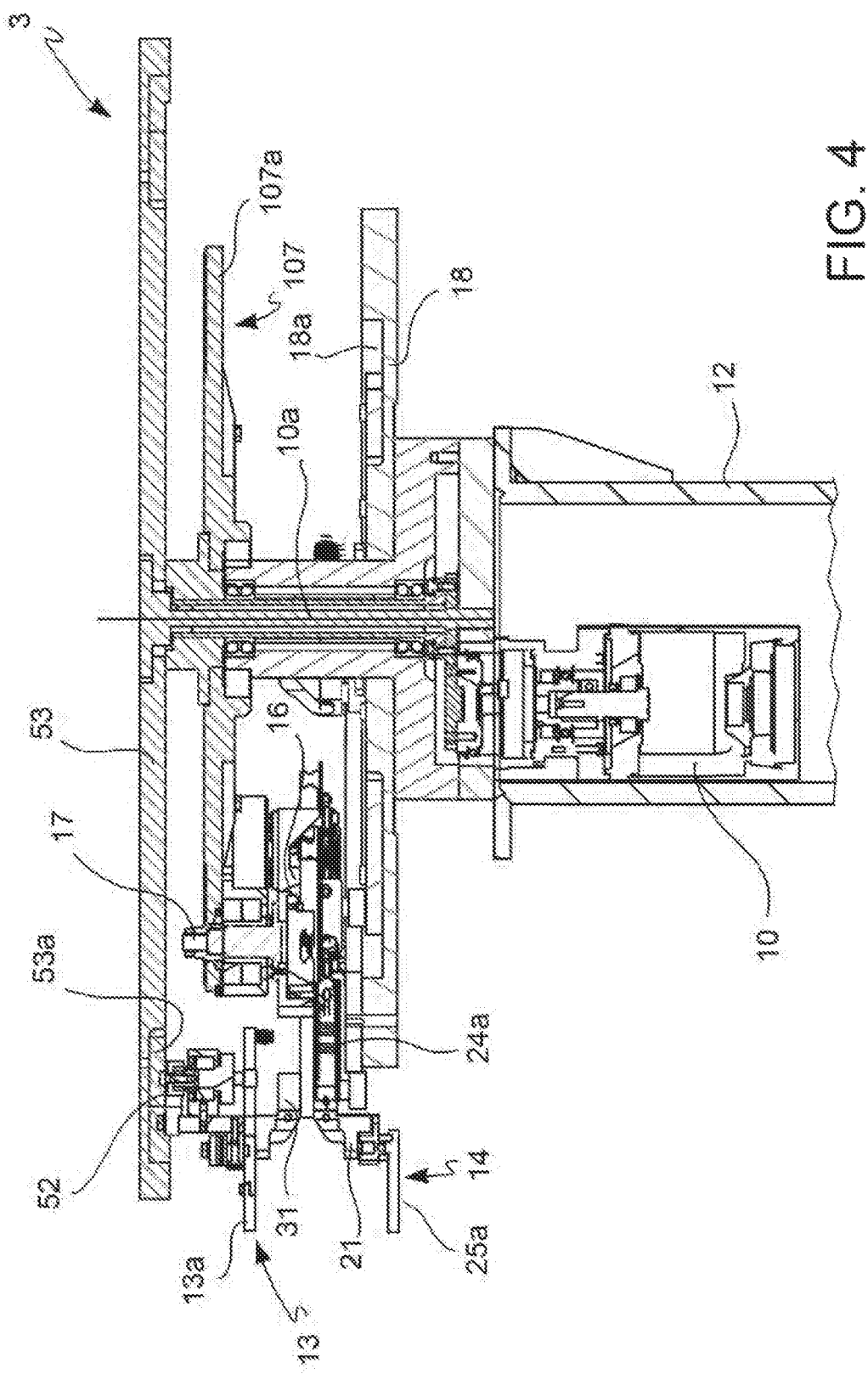
FIG. 4 represents an enlarged side view of a part of the detail in FIG. 2C.

Therefore, with reference to FIGS. 2C, 3 and 4, the distribution star 107 comprises a support disc 107a rotatably supported on a support structure 12 and rotated by a drive 10, preferably a brushless motor. The drive 10 is connected directly or by a reducer, to a drive shaft 10a, which is integral with the support disc 107a.

In some embodiments, the support structure 12 is hollow for receiving the drive 10 therein. Suitable removable grids 15 allow access to the drive to carry out the necessary maintenance.

The first and the second clamps 13, 14 are mounted paired onto a revolving stand 16 hinged to the support disc 107a by means of the pin 17. This allows the clamps 13, 14 to tilt, in alternate directions, around the axis of the pin 17 by a determined rotation angle α (see FIG. 9). Such rotation angle depends on the particular law of motion, which is linked to the format of the container produced, but it is preferably less than about 70°. The alternate movement of the clamps 13, 14 around the pin 17 is controlled by a cam 18, as will be described in greater detail later on, allowing the clamps 13, 14 to remain in a state of interference with the neck of the container (preform or bottle) for the time necessary for its transfer to and from the blowing unit 6. In practice, taking into account that both the carousel 4 and the distribution unit 3 rotate in the direction of the respective arrows (see FIG. 1), the clamps 13, 14 must follow such reciprocal rotation, in the opposite direction in relation to the rotation of the distribution unit 3, to remain in contact with the neck of the container for a period of time long enough to allow the transfer.

Figure 8:
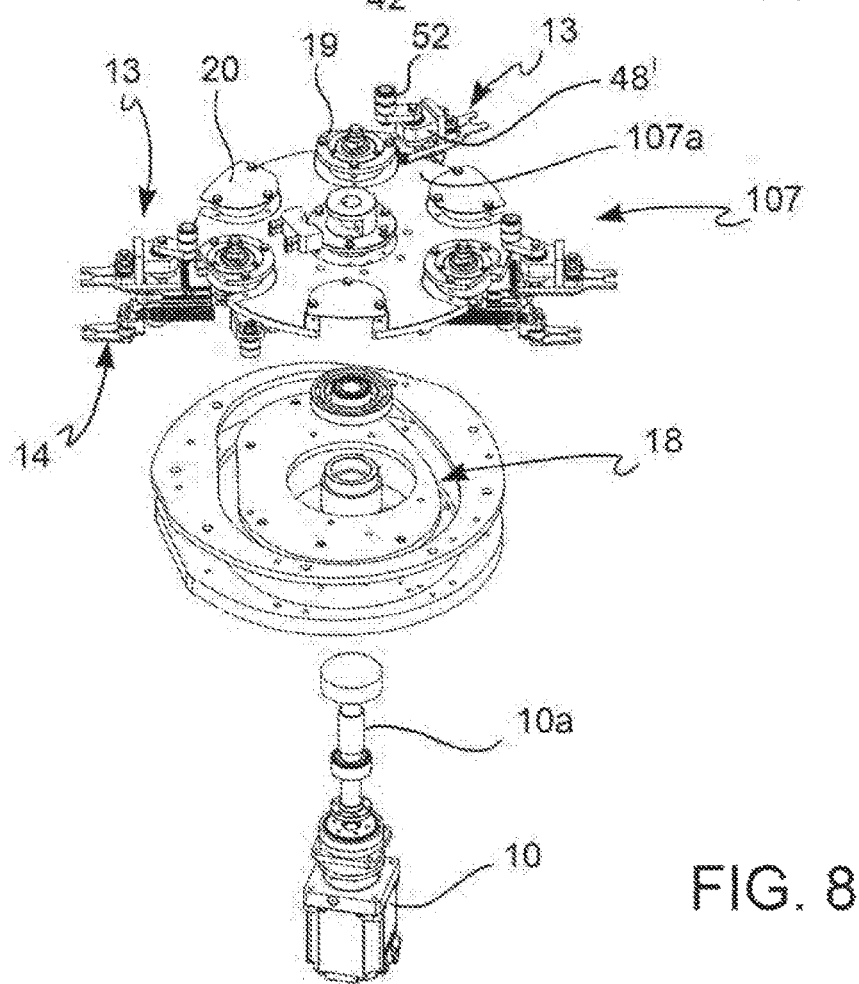
FIG. 8 represents an exploded perspective view of the detail in FIG. 2C.
Figure 10:
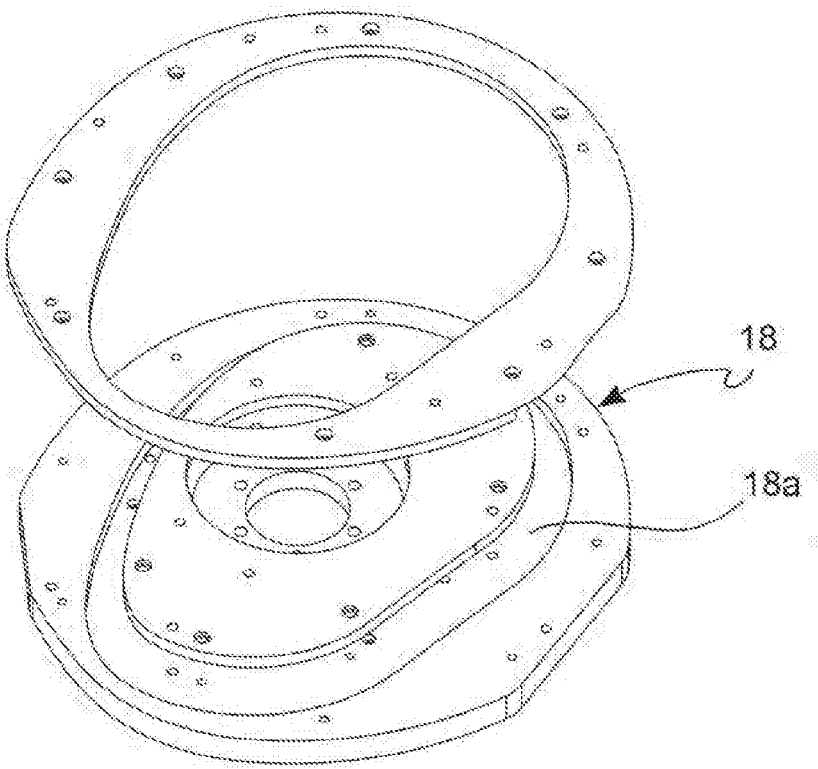
FIG. 10 represents a perspective view of the lower cam of the detail in FIG. 9.

Such alternate rotating movement of the clamps 13, 14, as stated above, is actuated by a cam 18, shown in FIGS. 8 and 10, which comprises a groove 18a with an elliptical-like shape, which creates the cam path. The cam 18 is attached to the support structure 12.

Figure 9:
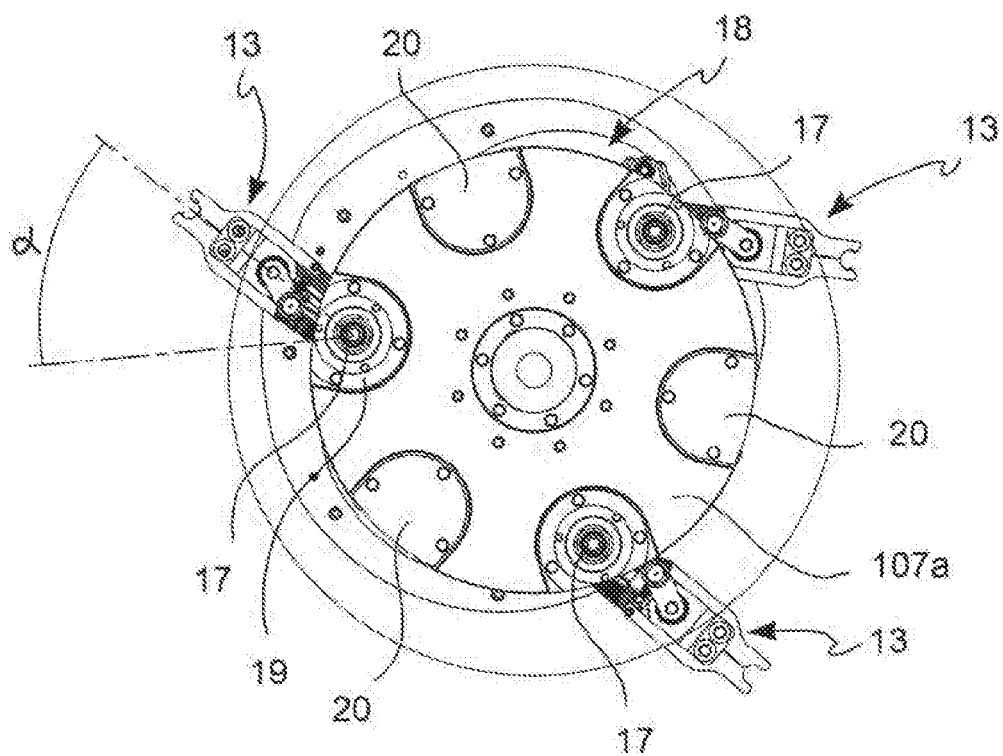
FIG. 9 represents a plan view from above of the detail in FIG. 8.

Instead, FIG. 9 shows a plan view showing a clamp 13 (at the bottom of the figure) placed at the opposite end of the angle α with respect to the other two clamps 13.

Figure 11:
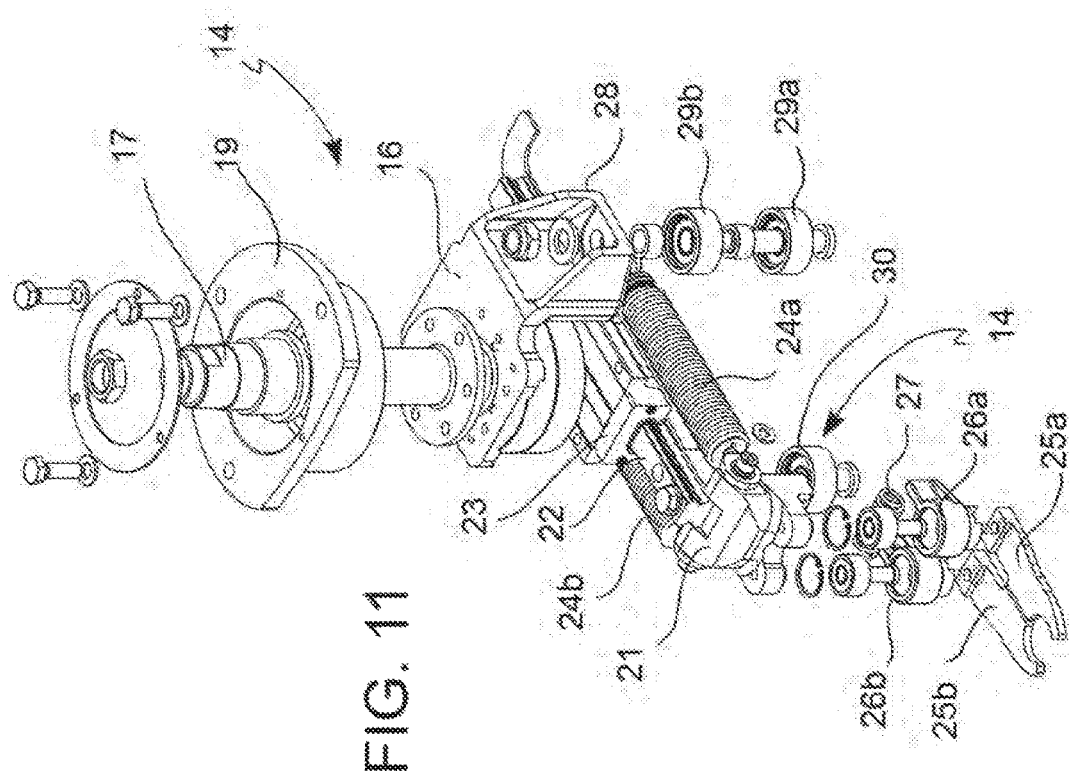
FIG. 11 represents an exploded perspective view of a passive clamp according to the invention.

FIG. 11 shows an exploded view of the revolving stand 16 on which a lower clamp 14 is mounted, while the respective upper clamp 13 is not shown.

The stand 16 is integral with the pin 17, which is attached to a plate 19. The plate 19 is designed to be housed in a seat 20 made on the upper side of the support disc 107a (FIG. 9), so as to guide the rotation in alternate directions of the clamps 13, 14.

A lower clamp 14 is attached to the revolving stand 16 at the bottom. The clamp 14 comprises a clamp body 21, which comprises a carriage 22 slidingly joined to a slide 23 attached to the revolving stand 16. The carriage 22 is arranged transversely with respect to the perimeter of the support disc 107a, so as to allow a distancing or an advancing movement of the clamp 14 with respect to the perimeter of the disc 107a. At the two sides of the carriage 22, first ends of two springs 24a, 24b are attached to the clamp body 21, whose opposite ends are attached, instead, to the revolving stand 16. The springs 24a, 24b are preferably compression springs, so as to exert a thrust on the clamp body 21, taking it from a retracted position to an extended position.

The claws 25a, 25b of the clamp 14 are hinged to the clamp body 21. Each claw 25a, 25b is coupled with a small lever 26a, 26b. The two small levers 26a, 26b are connected by a spring 27, in particular, a compression spring. In this way, the lower clamp 14 is of a passive type, in other words its opening and closing is carried out by interference with the neck of the container, in contrast with the return force exerted by the spring 27.

The revolving stand 16 comprises an actuator member of the alternate movement of the clamps 13, 14, which comprises a shelf 28 onto which two coaxial wheels 29a, 29b are hinged at the bottom constituting the driven member of the cam 18, designed to interact with the cam profile 18a. The axis of the wheels 29a, 29b is eccentric with respect to the pin 17, acting as a lever to allow such rotating movement of the revolving stand 16.

Another wheel 30 is hinged to the clamp body 21 at the bottom, so as to interact with the cam profile 18a and allow the distancing or advancing movement of the clamp 14 with respect to the revolving stand 16. The combination of such kinematics, alternate rotation of the revolving stand 16 and extension-retraction of the clamp 14, according to an opportune law of motion, allow the desired interference of the clamp 14 to be created with the neck of the container (specifically, the blown bottle) so as to achieve its collection from the blowing unit.

The upper clamp 13 is also attached to the revolving stand 16 by a connection element 31 making it integral with the carriage 22. However, in some embodiments, it is possible for the upper clamp 13 to slide on its own carriage, different from the carriage 22 of the lower clamp 14, but nonetheless being integrally movable therewith. The movement of the upper clamp 13 is therefore the same as that of the lower clamp 14 and takes place in synchrony.

In some preferred embodiments, the upper clamp 13 is an active clamp, in other words its opening is actively controlled by a suitable cam.

With reference to FIGS. 12A, 12B, 12C and 12D, the upper clamp 13 comprises two claws 13a, 13b, hinged onto the clamp body 43b by respective hinges 44a, 44b. Each of the claws 13a, 13b comprises a lever element 45a, 45b, which extends in the opposite direction to that of the claws 13a, 13b with respect to the hinges 44a, 44b. The distal ends 46a, 46b of the lever elements 45a, 45b are joined by a spring 47, in particular a traction spring.

A stop element 48 is placed between the two lever elements 45a, 45b to keep the claws 13a, 13b closed against the return force of the spring 47. The stop element 48 comprises a small plate 49 on one side of which, in correspondence with opposite ends, two bearings 50 are mounted idly, resting on the inner surface of the lever elements 45a, 45b. A small lever 51 is attached on the opposite side of the small plate 49. The small lever 51 is arranged along a substantially perpendicular direction to the axis X of the clamp 13. The distal end of the small lever 51 comprises a wheel 52, which protrudes upwards. The stop element 48 is mounted onto a support body 48', which is integral with the clamp body 43, so that the proximal end of the small lever 51 and the small plate 49 are connected by a pin 49', which crosses the support body 48' vertically.

As shown for example in FIG. 4, a second cam 53 is attached to the support structure 12, above the support disc 107a, having a cam path 53a with which the wheel 52 of the upper clamp 13 can interact, thus constituting the driven member of the cam.

Figure 12A:
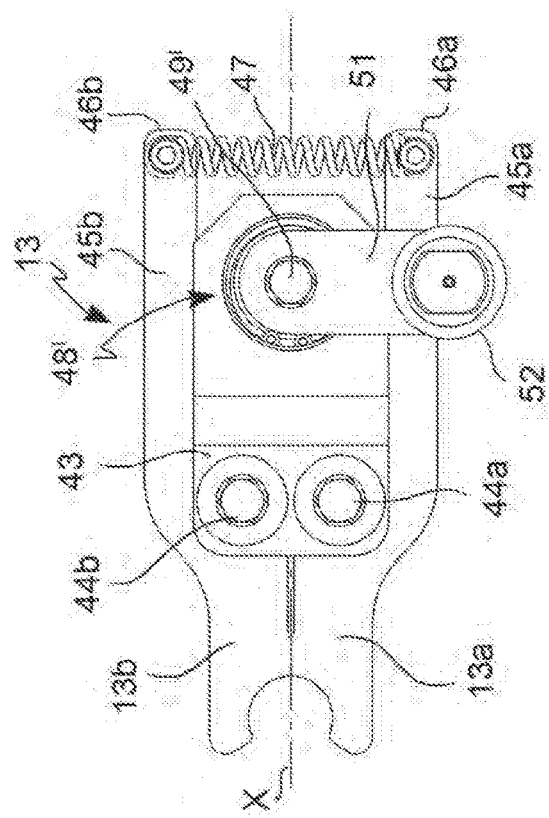
FIG. 12A represents a plan view from above of an active clamp according to the invention in a closed condition.
Figure 12B:
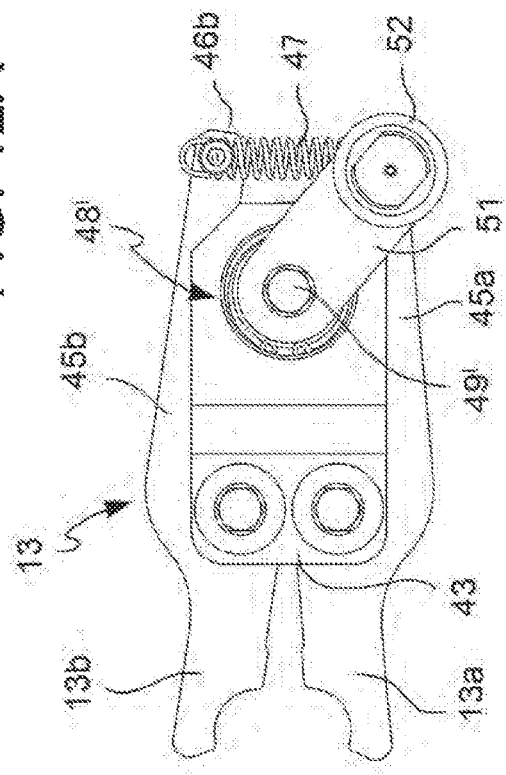
FIG. 12B represents the view in FIG. 12A in an open condition.
Figure 12C:
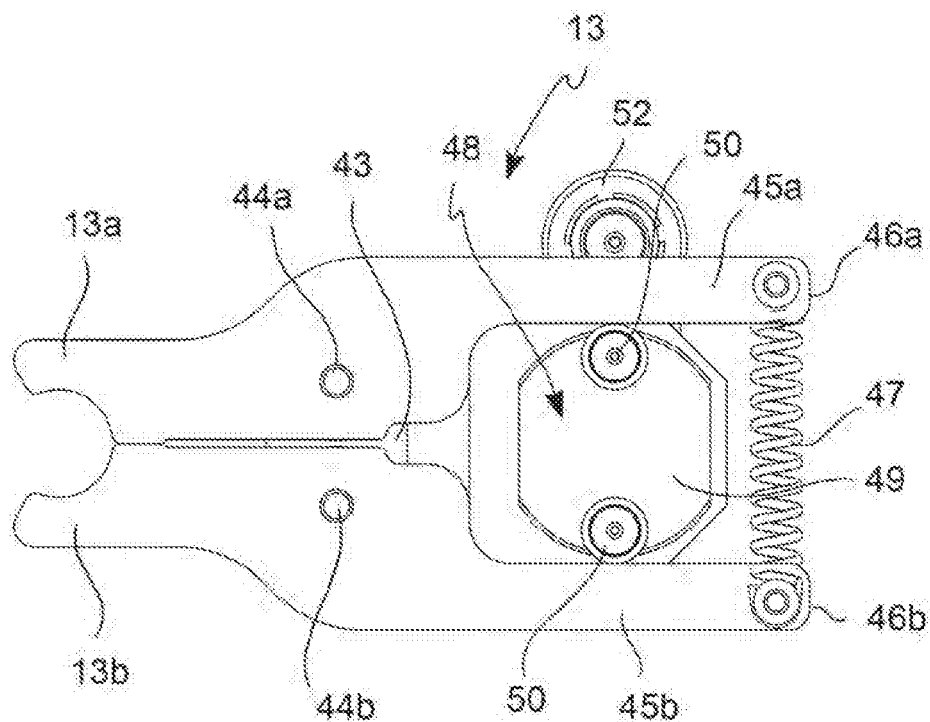
FIG. 12C represents a plan view from below of the clamp in FIG. 12A in a closed condition.
Figure 12D:
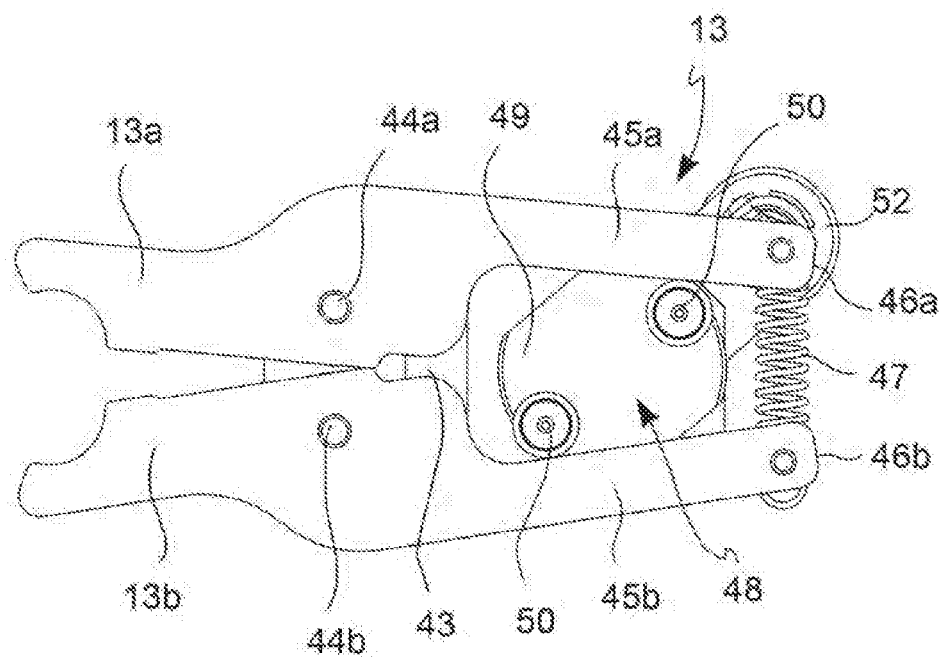
FIG. 12D represents the view in FIG. 12C in an open condition.

As shown in FIGS. 12B and 12D, when the small lever 51, guided by the cam 53 with the wheel 52, rotates by a certain angle with respect to its initial position in conjunction with the small plate 49, the bearings 50, placed at opposite ends of the small plate 49, are arranged diagonally, allowing the reciprocal advancing of the lever elements 45a, 45b, thanks to the return force effected by the spring 47, consequently allowing the claws 13a, 13b of the clamp 13 to open. When the small lever 51 moves back into the initial position (FIGS. 12A and 12C), again guided by the cam 53, the bearings 50 return to the transverse position, distancing the lever elements 45a, 45b—against the resistance of the spring 47—consequently closing the claws 13a, 13b.

In some embodiments, both the lower clamp 14 and the upper clamp 13 are active. Whereas, in other embodiments they are both passive.

Figure 5:
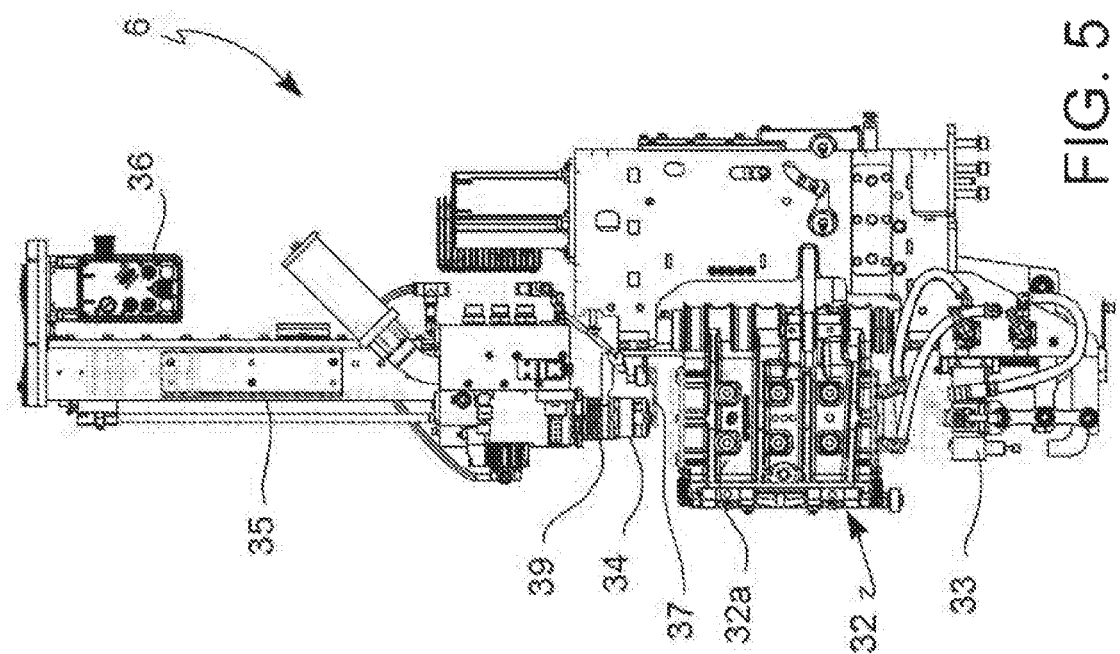
FIG. 5 represents a side view of a blowing unit according to the present invention.

FIG. 5 shows an embodiment of the blowing unit according to the invention. The blowing unit 6 comprises a mold 32 made of two die-halves 32a (only one of said die-halves is visible in the side view) and a bottom disc 33, designed to open in correspondence with the release point of a blown bottle and close again immediately downstream of the collection point of a preform to be blown, so as to allow access to the inner cavity. The blowing unit 6 also comprises a dispenser head 34 (the so-called "bell"), connected to a source of compressed air and provided with a dispenser nozzle, which is movable between a raised position (as shown in FIG. 5) and a lowered position, wherein the dispenser head 34 closes a cavity of the mold 32 at the top, so that it is leak-proof, and the dispenser nozzle introduces compressed air through the neck of the preform.

The dispenser head 34 of compressed air is vertically movable along a guide 35 by an actuator 36. The structure and working of the blowing unit presented thus far are fully conventional and will not, therefore, be further described.

The blowing unit 6 of the invention is different from conventional ones in that it comprises a clamp 37, which is movable between said raised position of the dispenser head 34 and a lowered position in contact with the upper surface of the mold 32. The clamp 37 is placed below the dispenser head 34 and allows the collection of a heated preform from an upper clamp 13 of the distribution unit 3 and its insertion into the mold 32, placed in a lower position, in other words at the level of the lower clamps 14 of the distribution unit 3. The clamp 37 is of a passive type, therefore the gripping of the preform is carried out by direct interaction with the neck of the same.

As shown better in the operating sequence in FIGS. 6A-D (wherein the blowing unit 6 is represented in a simplified form to facilitate the understanding of the kinematic motion), the clamp 37 is connected to the dispenser head 34 by means of an arm 38 with a C-shaped profile, having a portion sliding on the body of the dispenser head 34. For example, if the dispenser head 34 has a cylindrical shape, the arm 38 will be associated therewith by means of a sliding ring portion on said body. The dispenser head 34 comprises a shoulder 34' at the top and a spring 39 between said shoulder and the sliding portion of the arm 38.

Figure 6:
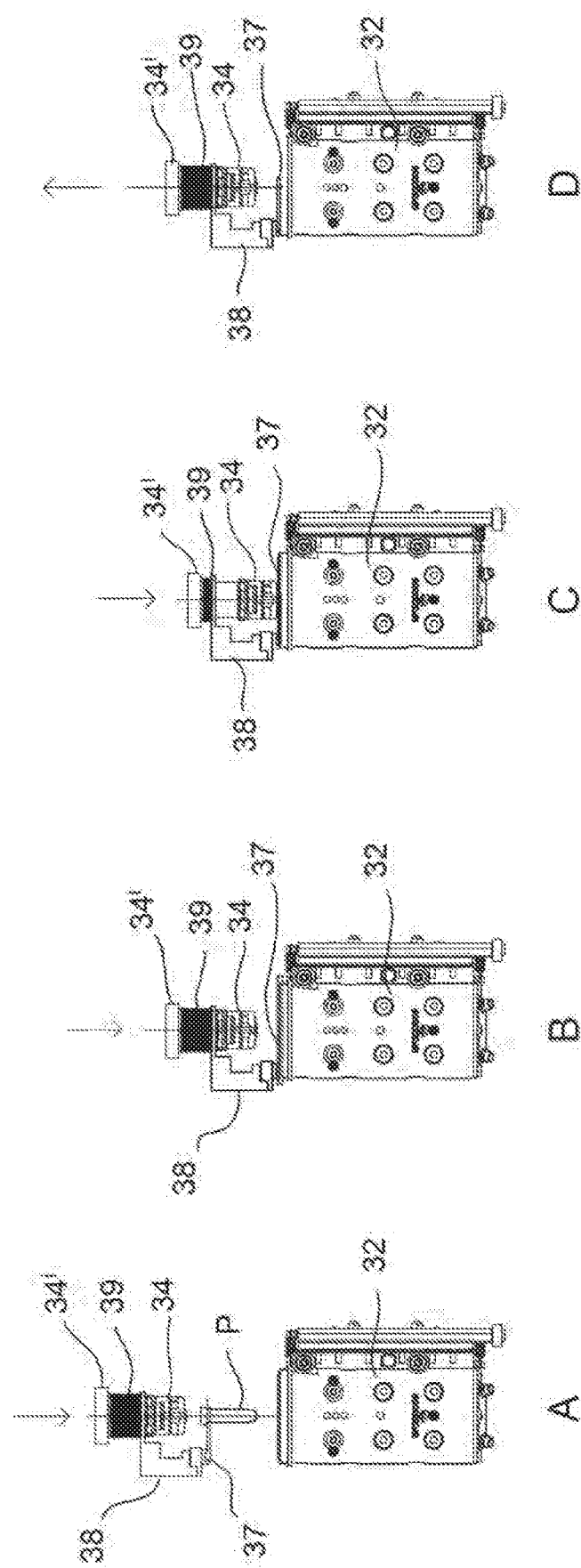
FIGS. 6 A-D represent a simplified operating sequence of the working scheme of the blowing unit in FIG. 5.

Again with reference to the operating sequence in FIGS. 6 A-D, FIG. 6A represents the state in which a heated preform P has already been transferred by an upper clamp 13 of the distribution unit 3 to the clamp 37 of the blowing unit, and in which the head dispenser 34—clamp 37 assembly is lowered by the actuator 36 to the contact position of the clamp 37 with the upper surface of the mold 32 (FIG. 6B).

Successively, (FIG. 6C) the actuator 36 lowers the dispenser head 34 further, compressing the spring 39, allowing the dispenser nozzle to be inserted into the neck of the preform P.

Finally, FIG. 6D shows the phase in which, on termination of the bottle blowing, the actuator 36 lifts the dispenser head 34—clamp 37 assembly and brings it back into the initial position, in which the clamp 37 can take another heated preform from the distribution unit 3. The clamp 37 returns to its initial position thanks to the spring 39, which is decompressed.

Figure 7:
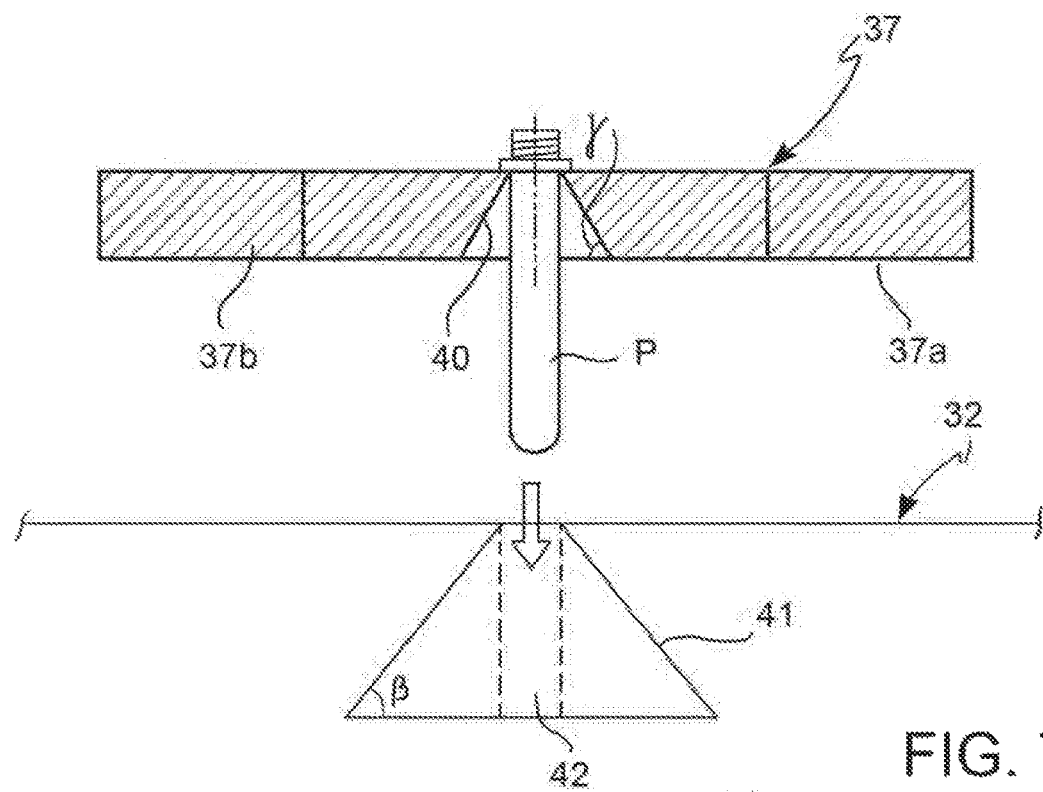
FIG. 7 represents a frontal schematic section view of a detail of the blowing unit in FIG. 5 in an operating phase.

FIG. 7 shows how the heated preform P is released by the clamp 37 to the mold 32. The clamp 37 comprises two claws 37a, 37b having an edge 40 in contact with the neck of the preform P, wherein the edge 40 has a flared downward profile. At the upper surface, the mold 32 has a conical element 41 having a vertical channel 42 of size and shape suitable for the introduction of a preform P. When the clamp 37 is lowered until it interacts with the upper surface of the mold 32 (FIG. 6B), the flared profile 40 of the claws 37a, 37b interferes with the conical element 41, whose conicity is characterized by an angle β with the base of the cone lower than the flaring of the edge 40, characterized by the angle γ with respect to the plane of the claw 37a, 37b. This interference causes the claws 37a, 37b to open and consequently the preform P to be released inside the mold 32.

Figure 13A:
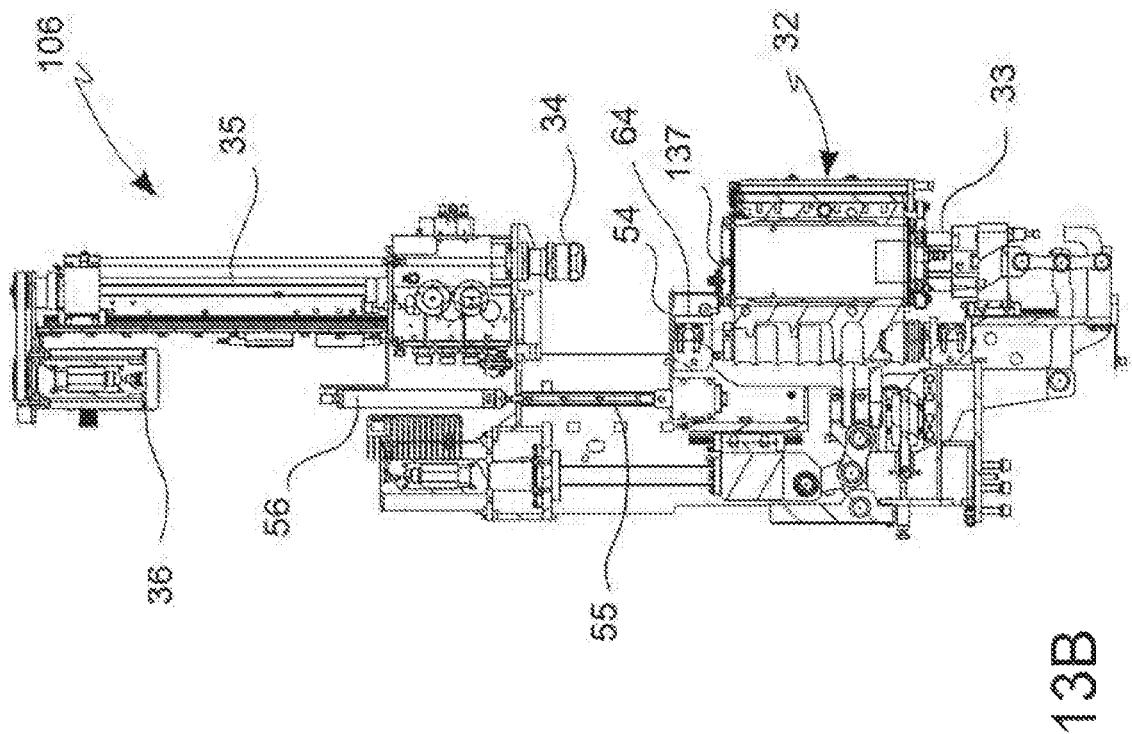
FIG. 13A represents a side view of a different embodiment of the blowing unit according to the invention in a first operating phase.
Figure 13B:
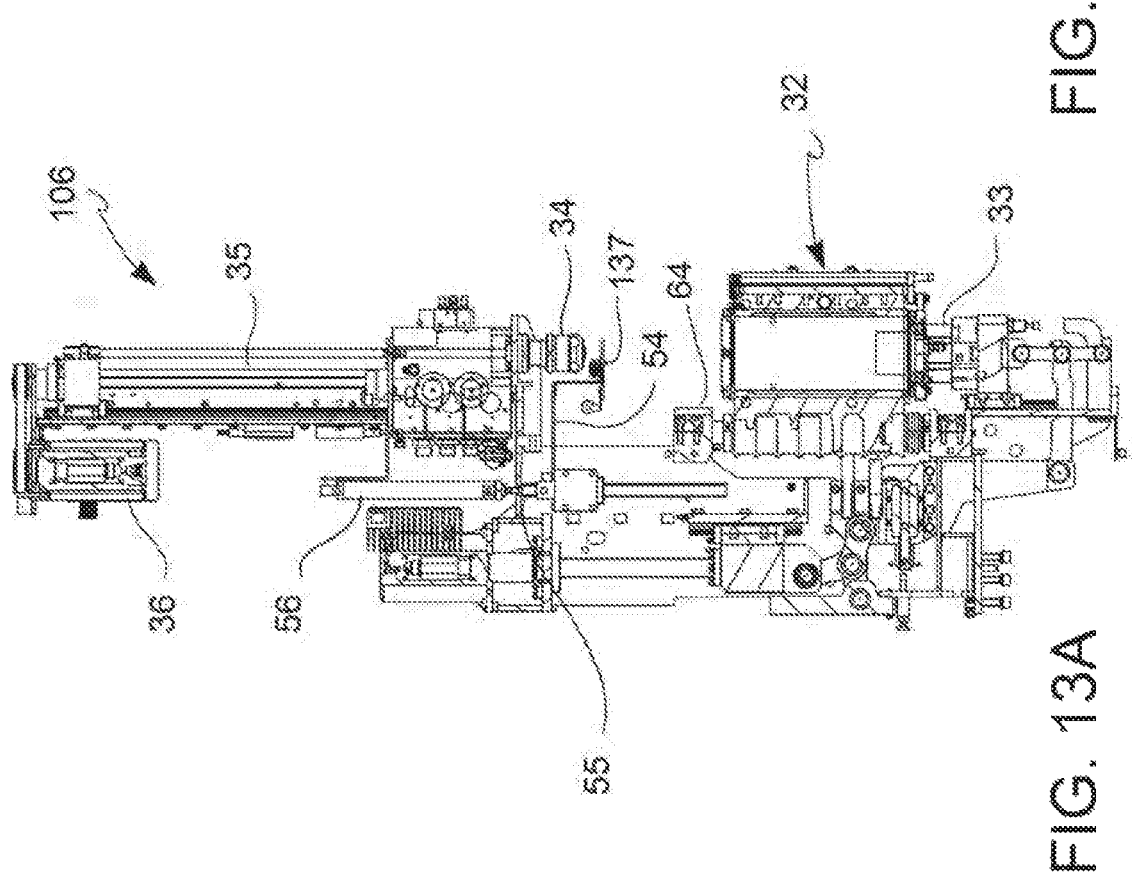
FIG. 13B represents the view in FIG. 13A in a second operating phase.

FIGS. 13A and 13B show a different embodiment of the blowing unit, indicated with number 106, wherein the elements in common with the first embodiment are indicated with the same numbering.

The difference with the first version of the blowing unit 6 described above consists of the fact that the clamp 137 is of an active type and is moved independently of the dispenser head 34.

More specifically, the clamp 137 is supported on an L-shaped bar 54, which is connected, in turn, to a vertical rod 55 sliding in a guide 56 under the action of an actuator, so that the clamp 137 can adopt a raised position (FIG. 13A)—in which a heated preform is collected from the distribution unit 3—and a lowered position (FIG. 13B), in which the clamp places itself at the level of the upper surface of the mold 32 and transfers the preform into its inner cavity.

Figure 14A:
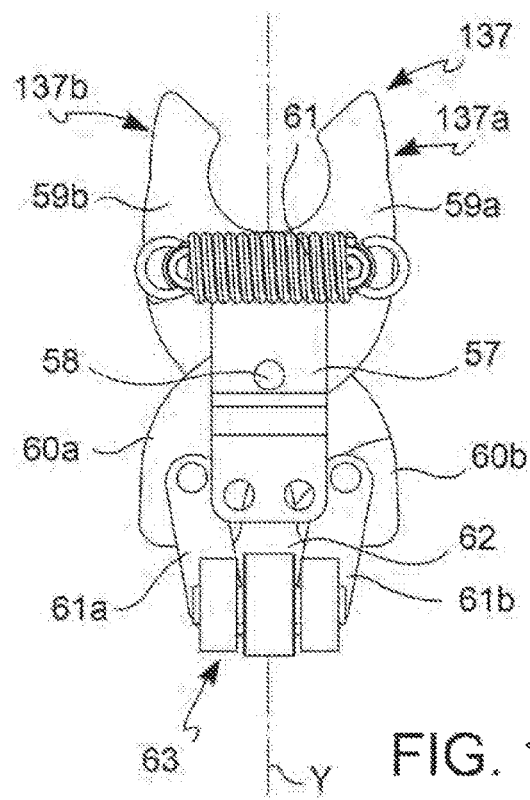
FIG. 14A represents a plan view from above of the clamp of the blowing unit in FIG. 13A in a closed condition.
Figure 14B:
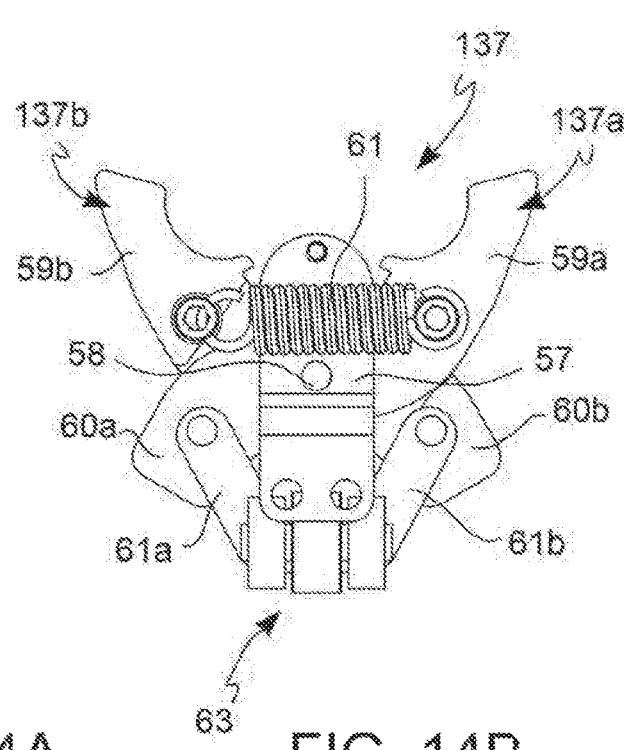
FIG. 14B represents the view in FIG. 14A in an open condition.
Figure 15:
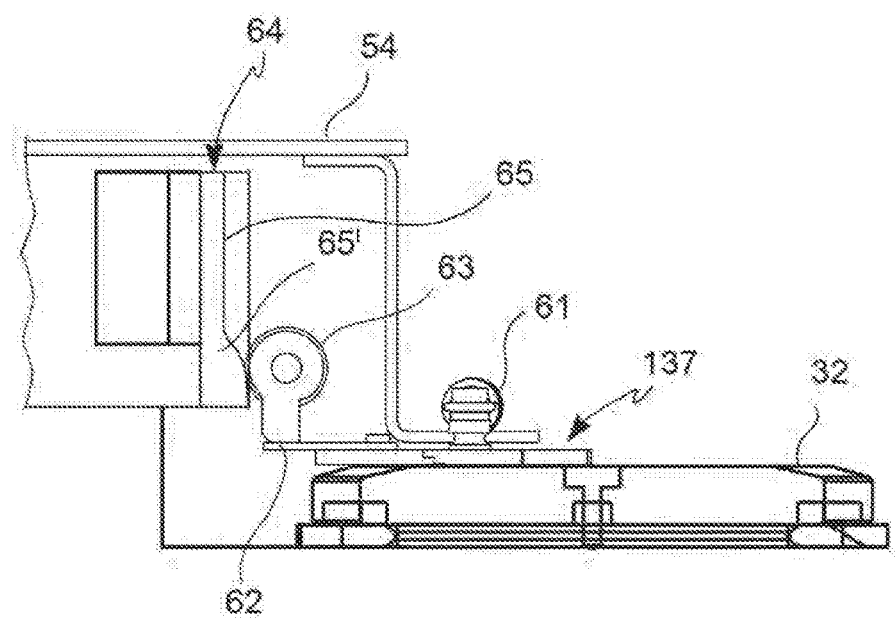
FIG. 15 represents a side view of a detail of the blowing unit in FIG. 13B.

As said above, the clamp 137 is of an active type, in other words its opening-closing is carried out by interaction with a cam. To this end, as shown in FIGS. 14A, 14B and 15, the clamp 137 comprises two claws 137a, 137b having respective gripping portions 59a, 59b and respective lever portions 60a, 60b. The claws 137a, 137b are hinged, at point of junction between the gripping portions 59a, 59b and the lever portions 60a, 60b, onto the clamp body 57 by means of the pin 58 making an X-shaped intersected coupling.

The gripping portions 59a, 59b are connected by a traction spring 61, which keeps them in a closed position (FIG. 14A). Whereas, respective arms 61a, 61b are hinged onto the distal ends of the lever portions 60a, 60b. In turn, the distal ends of the arms 61a, 61b are hinged onto a plate 62 so as to form a pantograph or articulated parallelogram system. A driven member 63 of a cam is attached to the plate 62. The driven member 63 is made up, for example of three wheels with a horizontal axis perpendicular to the Y-axis of the clamp 137.

The driven member 63 interacts with a cam 64 having a vertical cam profile 65, which presents a lower portion 65' projecting towards the clamp 137. In this way, when the clamp 137, which moves downwards in the step of loading the preform into the mold 32, approaches the cam 64, the driven member 63 interacts with the path of the cam 65' causing the plate 62 to move forward. Thanks to the pantograph system, the claws 137a, 137b open and move back at the same time (see FIG. 14B). In this way, the preform is released and the clamp 137 moves back just enough to avoid interfering with the dispenser head 34, which, in the meantime, is brought from the raised position to the lowered operating position, in which the blowing of the bottle is carried out.

The working of the movement system according to the invention is clear from the above description. The heated preforms coming out of the oven 2 are taken by the upper clamps 13 of the distribution unit 3, which, for example, rotates clockwise. When a clamp 13 is in proximity to the tangent point with the carousel 4, which rotates, instead, in the opposite direction, the preform is transferred by the upper clamp 13 of the distribution unit 3 to the clamp 37, 137 of the blowing unit 6, 106. As said, the upper clamp 13 is of an active type, movable along the angle α and in extension along the axis of the clamp, so as to follow the movement of the distribution star 107 in counter-rotation, consequently prolonging the time of contact with the preform, aiding its correct transfer. Vice versa, the clamp 37, 137 acts passively (the clamp 137 in FIG. 14A-B only acts actively in the step of transferring the preform to the mold 32).

The clamp 37, 137 is consequently lowered until the preform is transferred to the mold 32 and the dispenser head 34 closes the mold 32 immediately afterwards and insufflates compressed air into the preform to form the bottle. Once such operation is finished, the mold 32 opens just before it comes in correspondence with the distribution unit 3, where the blown bottle is transferred to a lower clamp 14, which, as stated is of a passive type. In this case, too, the combined movement—rotating along the angle α and in extension along the axis of the clamp—of clamp 14 assists the transfer of the bottle from the mold 32 to the distribution star 107. Then, as known, the bottle is transferred to the transport system 5.

Figure 16:
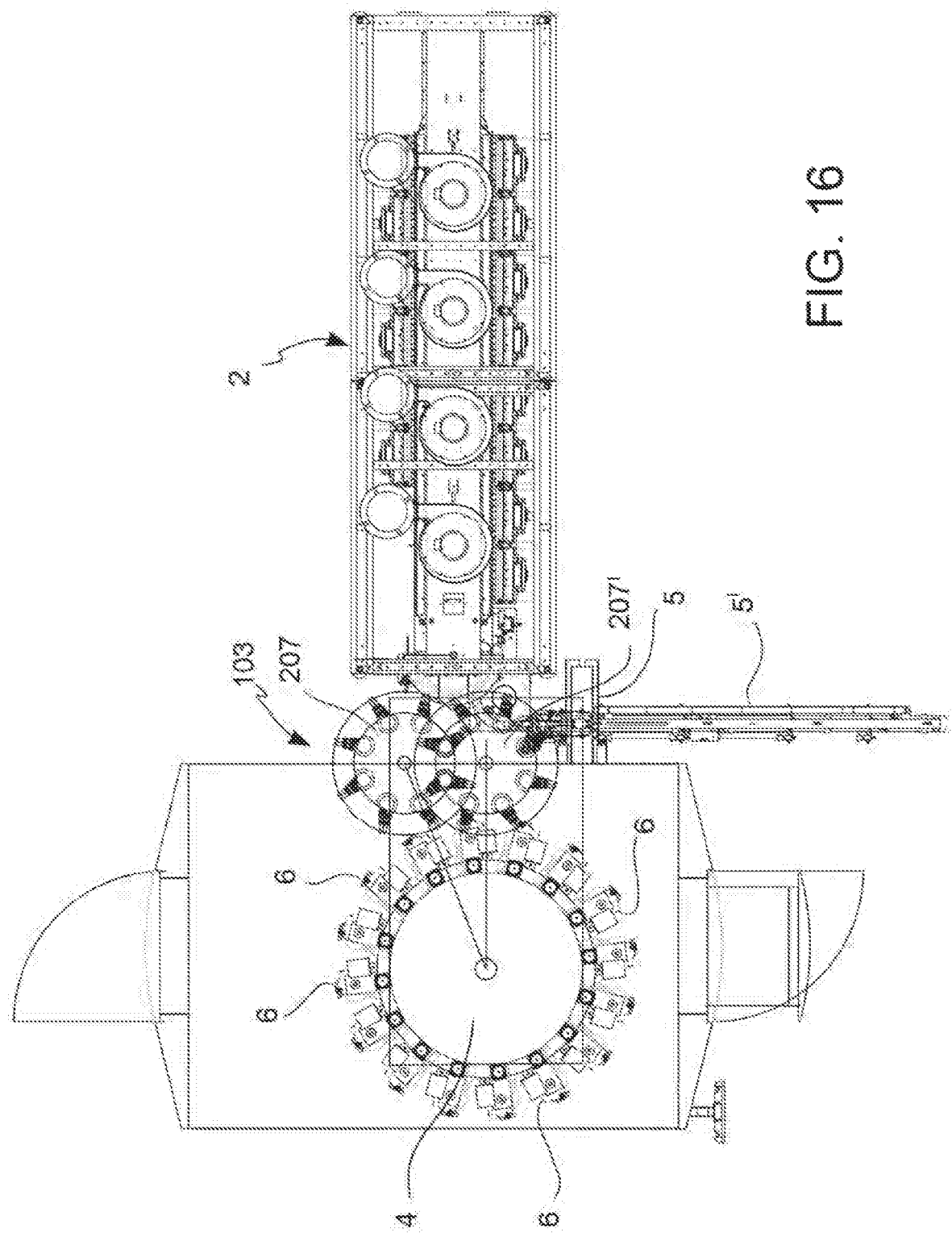
FIG. 16 represents a plan view from above of a second embodiment of the container blowing system comprising the movement system according to the invention.

According to a different embodiment of the movement system of containers according to the invention, as shown in FIG. 16, the distribution unit 103 comprises two separate distribution stars 207, 207' arranged partially overlapping and on different planes. The upper distribution star 207 will comprise the upper clamps 13, while the lower distribution star 207' will comprise the lower clamps 14. In this case, the two distribution stars 207, 207' can be moved by different drives or by the same drive by means of opportune movement transmission members. Furthermore, each of the distribution stars 207, 207' will have its own cam 18 for the rotating movement and in extension of the clamps 13, 14, while only the upper distribution star 207 will also comprise the cam 53 for the active opening-closing of the upper clamps 13.

The two distribution stars 207, 207' are placed at a tangent with different points of the carousel 4, one for transferring the preform to the mold and one for taking the bottle from the mold, even though their partial overlapping allows such contact points to be very close together.

The main advantage of the movement system of containers according to the invention lies in the fact that the transfer point of the preform and the collection point of the blown bottle substantially coincide or are very close (variation in FIG. 16). This allows the whole or most of the rotation of the carousel to be exploited for completing the blowing operation. This significant useful path increase (or in other words reduction in the dead angle) allows the carousel 4 rotation speed to be increased and consequently plant productivity.

Furthermore, the spatial arrangement of the movement system described above also allows a significant reduction in dimensions, improved drive management (particularly in the case where only one drive 11 is used) and less demanding maintenance.

Clearly, only a few particular embodiments of the present invention have been described, to which an expert in the field will be able to make all of the necessary modifications to adapt it to particular applications, without deviating from the protective scope of the present invention.

For example, although the previous description was dedicated to a bottle blowing machine, the movement system of containers of the invention can also easily be applied to other machine typologies. A typical example is a machine for filling bottles, wherein the mold 32 is replaced by a plate, which supports the bottle to be filled and the dispenser head 34 of compressed air is replaced by a filling valve in fluid communication with a filling liquid.

In a further variation of the above mentioned filling machine, the vertical movement of the clamp 37, 137 and the filling valve can be replaced by the movement of the bottle support plate, which, in this case, will move between a raised position, wherein the plate receives the bottle from the distribution star 107, and wherein filling is carried out by the filling valve, and a lowered position, wherein the filled bottle is taken by a lower clamp 14 of the distribution star 107.

What we claim is:

1. A movement system of containers to and from a processing unit of said containers, comprising:
    a rotating carousel at the perimeter of which a plurality of said processing units are arranged;
    a distribution unit of said containers, comprising at least one distribution star placed substantially at a tangent to said carousel and rotating in synchrony but in the opposite direction to said carousel,
    wherein
    said distribution unit comprises a plurality of upper clamps for the transfer of a container to a respective processing unit and a plurality of lower clamps for the transfer of a container from said processing unit to said distribution unit,
    and wherein
    said processing unit comprises a clamp movable between an upper position at the level of said upper clamps of the distribution unit, to take a container by a respective upper clamp of the distribution unit, and a lower position at the level of said lower clamps of the distribution unit, for the transfer of said container to said processing unit.

2. The movement system according to claim 1, wherein the distribution unit comprises a distribution star which comprises a plurality of upper clamps and a plurality of lower clamps, in which the upper clamps are placed higher than the lower clamps and aligned therewith on a vertical axis.

3. The movement system according to claim 2, wherein the distribution star comprises a support disc rotatably supported on a support structure and rotated by a drive, the upper and lower clamps being mounted paired on a revolving stand hinged to the support disc.

4. The movement system according to claim 3, wherein the revolving stand can rotate, in alternate directions, around a vertical axis.

5. The movement system according to claim 3, wherein the revolving stand is integral with a pin, which is attached to a plate, in which the plate is housed in a seat made on the upper side of the support disc, so as to guide the rotation in alternate directions of the clamps.

6. The movement system according to claim 1, wherein each of said lower clamps comprises a clamp body which comprises a carriage slidingly joined to a fixed slide, the carriage being placed at right angles to the perimeter of the distribution star in order to allow a movement of the clamp towards or away from the perimeter of the distribution star, the carriage being associated with springs, preferably compression springs, so as to exert a thrust on the clamp body to take it from a retracted position to an extended position.

7. The movement system according to claim 1, wherein said lower clamps are passive, i.e. they are opened and closed by interference with the neck of the container, in contrast to the return force exerted by a respective spring.

8. The movement system according to claim 3, wherein the distribution star comprises an actuator member of the alternate movement of the clamps, which comprises a driven member and a cam, said driven member being placed on said revolving stand and being paired with a cam profile of said cam.

9. The movement system according to claim 8, wherein a wheel is hinged below the clamp body and is coupled with the cam profile of the cam so as to enable the movement of the bottom clamp away from or towards the perimeter of the distribution star.

10. The movement system according to claim 3, wherein the upper clamp is attached to the revolving stand by means of a connection element making it integral with the carriage.

11. The movement system according to claim 1, in which each of the upper clamps comprises two claws, hinged to the clamp body by respective hinges, each claw comprising a lever element, which extends in the opposite direction to that of the claws with respect to the hinges, the lever elements comprising respective distal ends joined by a spring.

12. The movement system according to claim 11, in which between the two lever elements a stop element is placed which keeps the claws closed against the spring return force, said stop element being unlockable by means of a cam.

13. The movement system according to claim 12, wherein the stop element comprises a plate on one side of which, at opposite ends, two bearings are idly mounted which press on the inner surface of the lever elements, on the opposite side of the plate there being fastened a small lever having a distal end which comprises a wheel protruding upwards having the function of driven body of the cam.

14. The movement system according to claim 13, wherein the small lever is placed along a direction substantially perpendicular to the axis (X) of the clamp.

15. The movement system according to claim 1, wherein said processing unit is a blowing unit of bottles from heated preforms, comprising:
    a mold for blowing and shaping a bottle, and
    a dispenser head of compressed air movable between an upper and a lower position wherein the dispenser head closes the mold from above and blows compressed air through the neck of a preform,
    and wherein the clamp is connected to the dispenser head by means of a C-shaped arm having a portion sliding on the body of the dispenser head, the dispenser head comprising a shoulder and a spring placed between said shoulder and the sliding portion of the arm of the clamp.

16. The movement system according to claim 15, wherein the clamp comprises two claws having a contact edge with the neck of the preform, wherein the edge has a flared profile downwards,
    and wherein the mold comprises, at the upper surface, a conical element having a vertical channel of size and shape suitable for the introduction of said preform and having a taper, characterized by an angle $\beta$ with the base of the cone, less than the flaring of the edge, characterized by the angle $\gamma$ with respect to the plane of the claw so that, when the clamp is lowered sufficiently to interact with the upper surface of the mold, the flared profile of the claws interferes with the conical element causing the opening of the claws.

17. The movement system according to claim 1, wherein said processing unit is a blowing unit of bottles from heated preforms, comprising:
a mold for blowing and shaping a bottle, and
dispenser head of compressed air movable between an upper and a lower position wherein the dispenser head closes the mold from above and blows compressed air through the neck of a preform,
and wherein the clamp of the blowing unit is of the active type and is moved independently of the dispenser head.

18. The movement system according to claim 17, where the clamp is supported on an L-shaped bar, in turn connected to a vertical rod sliding in a guide under the action of an actuator, so that the clamp can adopt an upper position, in which withdrawal of a heated preform from the distribution unit takes place, and a lower position, in which the clamp places itself at the height of the upper surface of the mold and transfers the preform into the cavity inside it.

19. The movement system according to claim 18, wherein the clamp comprises two claws having respective gripping portions and respective lever portions, the claws being hinged, at the point of junction between the gripping portions and the lever portions, on the clamp body, creating an X-shaped intersected coupling,
and wherein the gripping portions are connected by a tension spring that keeps them in the closed position,
and wherein on the distal ends of the lever portions respective arms are hinged the distal ends of which are hinged on a plate so as to form a pantograph or articulated parallelogram system,
and wherein on the plate a driven member of a cam is attached, having a vertical cam profile presenting a lower portion projecting towards the clamp.

20. The movement system according to claim 1, wherein the distribution unit comprises two separate distribution stars partially overlapping and at different levels, the upper distribution star comprising said plurality of upper clamps and the lower distribution star comprising said plurality of lower clamps.

21. The movement system according to claim 1, in which said processing unit of the containers is a filling unit.

22. The movement system according to claim 20, in which said processing unit of the containers is a filling unit.

23. A system for blowing bottles from heated preforms, comprising:
an oven for heating said preforms,
movement system comprising
(a) a rotating carousel at the perimeter of which a plurality of blowing units are arranged comprising a mold for blowing and shaping a bottle, and a dispenser head of compressed air movable between an upper and a lower position wherein the dispenser head closes the mold from above and blows compressed air through the neck of a preform, and
(b) a distribution unit of said preforms towards said blowing unit and of blown bottles from said blowing unit towards said distribution unit,
a transport system of the blown bottles toward a subsequent processing unit, wherein said movement system is as defined in claim 1.

24. A movement system according to claim 3, wherein said drive comprises a brushless motor.

25. A movement system according to claim 11 wherein said spring is a tension spring.

* * * * *